May 22, 1951     O. HAJEK     2,553,821
AUXILIARY STEAM ENGINE
Filed Oct. 23, 1947
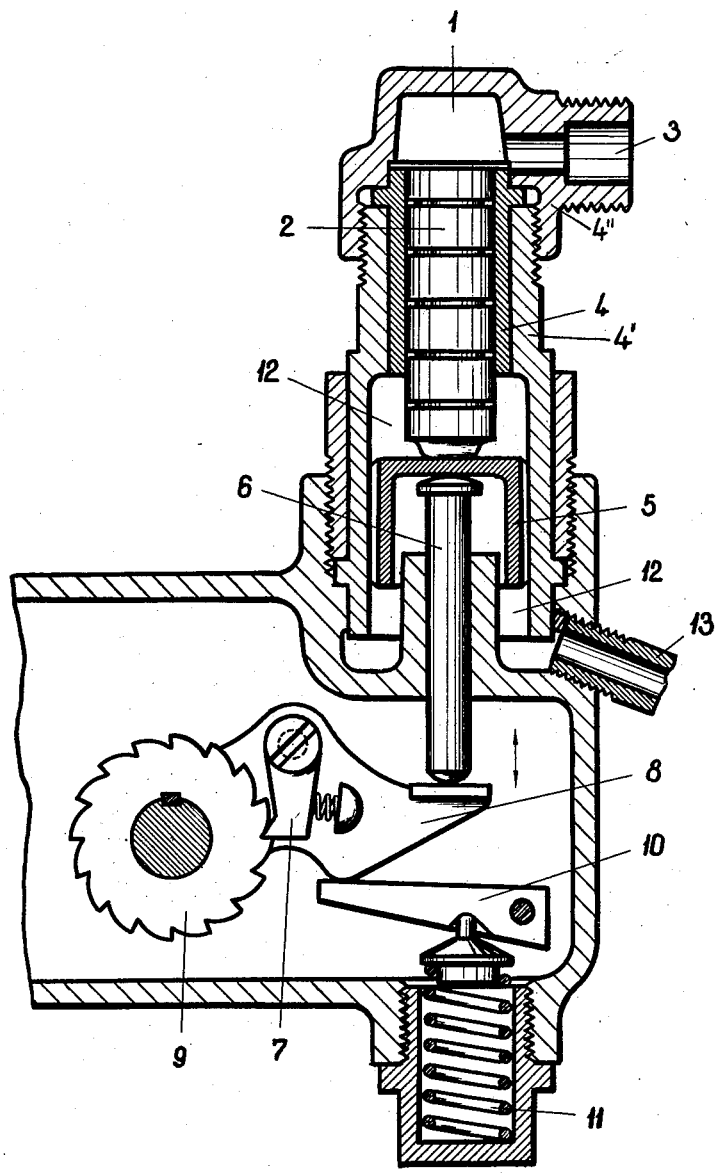
INVENTOR:
OTTO HAJEK
BY K. A. Mayr
ATTORNEY.

Patented May 22, 1951

2,553,821

UNITED STATES PATENT OFFICE 2,553,821

AUXILIARY STEAM ENGINE

Otto Hajek, Vienna, Austria, assignor to Alex. Friedmann, Kommanditgesellschaft, Vienna, Austria Application October 23, 1947, Serial No. 781,718
In Austria October 25, 1946

4 Claims. (Cl. 121—134)

This invention relates to a piston assembly in which a piston is moved in a cylinder by steam of varying pressure. Such pistons and cylinders are used, for example, for driving lubricating pumps of steam engines. In such pumps, the cylinder space of the steam engine is in communication with the working chamber of the piston of the auxiliary assembly, so that the piston is subjected to the varying pressure of the steam of the cylinder of the engine and moves in one direction against the tension of a spring as the pressure rises and back in the other direction, due to the tension of the spring, as the pressure falls. These movements can be used, for example for operating the control lever of a lubricating pump, which is driven by the steam engine and lubricates the latter. If the steam condensed in the cylinder of the auxiliary apparatus is unable to flow off, there is a danger that it will freeze in the winter when the apparatus is at rest and hinder the operation of the apparatus, or cause some other damage.

It is an object of the present invention to provide for draining condensate from an auxiliary steam engine by making the piston of a material having a greater thermal co-efficient of expansion than the cylinder, and by so selecting the diameter and materials of the piston and cylinder that the clearance between the cold piston and cylinder permits the passage of the condensate collecting in the working chamber of the cylinder, while the required close fit of the piston in its cylinder is produced by the thermal expansion caused by the operating temperature of the device. The condensate collecting in the cylinder during starting and when the apparatus is at rest and cooling passes through the clearance between the piston and the cylinder from one side of the piston to the other, whence it can flow off. As soon as the piston and the cylinder have been heated to normal operating temperature by the steam, this clearance is so reduced that the piston fits sufficiently closely in the cylinder to assure satisfactory operation. Upon cooling of the device the water is automatically discharged from the cylinder, and the device is safe from damage by frost and the like.

One embodiment of the invention is illustrated diagrammatically and by way of example in the accompanying drawing which represents a piston apparatus operated by varying steam pressure.

In the embodiment illustrated, the space 1 above the piston 2 is in communication through a tubular connection 3 with, for example, the cylinder space of a piston steam engine. The pressure in the space 1 therefore varies synchronously with the pressure in the working cylinder of the engine. As the pressure increases, the piston 2 is moved downwards in a cylinder 4, whereby it pushes down a slide 5, having the shape of an inverted cup, and a plunger 6. The plunger 6 moves a lever 8 carrying a detent 7 in clockwise direction, the detent or pawl 7 actuating a ratchet wheel 9 operating a lubricating pump. Lever 8 is in engagement with a lever 10 which is turned down against the tension of a spring 11 upon a downstroke of piston 2. When the steam pressure in the space 1 falls, the piston 2 moves upwards in the cylinder 4. This reciprocating movement of the piston 2 drives the lubricating pump in synchronism with the operating cycles of the steam engine.

When the device is cold, piston 2, which is made of a material having a high coefficient of expansion, for example an alloy of copper or a steam-resistant alloy of aluminium, has a smaller diameter than the bore of the cylinder member 4, which is made of a material having a very low coefficient of expansion, such as steel. The greater clearance between the piston and the bore of the cylinder member 4 allows the condensate collecting in the space 1 when the steam engine is started to pass from the upper side of the piston 2 out of the space 1 and down into the space 12, whence it flows off through a pipe 13. This discharge of the condensate is also ensured after the cooling of the apparatus.

During normal operation, the piston 2 and the cylinder 4 are heated. The piston 2 then fills the bore of the cylinder 4, provided that the materials and dimensions are appropriately chosen, in such a manner that the tightness necessary for operation is ensured.

As can be seen in the drawing, the cylinder 4 may be formed by a sleeve member inserted in a casing 4' and having on its outside a collar 4" acting as a sealing means sealing the outside of the sleeve member to the casing against communication thereat between the steam chamber 1 and the condensate chamber 12.

What I claim is:

1. An auxiliary steam engine comprising a steam chamber connected with a source of steam of varying pressure, a piston chamber below said steam chamber and communicating therewith, a condensate trap chamber beneath said piston chamber and communicating therewith, a piston assembly having a piston member reciprocatingly movable in said piston chamber and spring loaded substantially reciprocatingly movable means extending through and outside of said condensate chamber and tending to force said piston member against the pressure of the steam in said steam chamber, said piston member being made of a material having a greater coefficient of heat expansion than said piston chamber and leaving a clearance through which condensate flows from said steam chamber to said condensate trap chamber when the engine is cold and filling said piston chamber and leaving no clearance when the engine is hot as during normal operation.

2. An auxiliary steam engine comprising casing means having a cavity communicating with a source of steam of varying pressure and a piston chamber below said cavity and a condensate trap chamber below said piston chamber, a sleeve member in said piston chamber comprising sealing means sealing the outside of said member to the casing means against communication thereat between the steam chamber and the condensate chamber, a piston assembly having a piston member reciprocatingly movable in said sleeve member and spring loaded means extending through and outside of said condensate chamber and tending to force said piston member against the steam pressure in said steam chamber, said piston member being made of a material having a greater coefficiency of heat expansion than said sleeve member and leaving a clearance between the piston member and the sleeve member for condensate flow from the steam chamber to the condensate chamber when the engine is cold and filling the clearance when the engine is hot as during normal operation.

3. An auxiliary steam engine comprising a steam chamber connected to a source of steam of varying pressure, a vertical piston chamber below said steam chamber and communicating therewith, a condensate trap chamber beneath said piston chamber and communicating therewith, a piston assembly having a piston member reciprocatingly movable in said piston chamber and spring loaded reciprocatingly movable means extending below said piston member and outside said condensate trap chamber and tending to force said piston member upward against the pressure of the steam in said chamber, said piston member being made of a material having a greater coefficient of heat expansion than said piston chamber and leaving a clearance through which condensate flows from said steam chamber to said condensate trap chamber when the engine is cold and filling said piston chamber and leaving no clearance when the engine is hot as during normal operation.

4. An auxiliary steam engine as defined in claim 3, said spring loaded means comprising an inverted cup member movable up and down in said condensate chamber and abutting said piston member from below and a rod member extending into said cup member from below and outside of said condensate chamber.

OTTO HAJEK.

REFERENCES CITED

The following references are of record in the file of this patent:

UNITED STATES PATENTS

| Number | Name | Date |
|--------|------|------|
| 2,130,923 | Jardine | Sept. 20, 1938 |
| 2,221,535 | Berry | Nov. 12, 1940 |
| 2,262,132 | Berry | Nov. 11, 1941 |
| 2,455,305 | Heva | Nov. 30, 1948 |